United States Patent
Titus et al.

(10) Patent No.: US 11,982,382 B2
(45) Date of Patent: May 14, 2024

(54) QUICK CONNECTOR WITH BRACKET RETAINER

(71) Applicant: Cooper-Standard Automotive Inc., Northville, MI (US)

(72) Inventors: Tisiphone A. Titus, Warren, MI (US); Arthur Janik, Oftersheim (DE); Brian James Cardwell, Ypsilanti, MI (US)

(73) Assignee: Cooper-Standard Automotive Inc., Northville, MI (US)

( * ) Notice: Subject to any disclaimer, the term of this patent is extended or adjusted under 35 U.S.C. 154(b) by 201 days.

(21) Appl. No.: 17/181,220

(22) Filed: Feb. 22, 2021

(65) Prior Publication Data

US 2022/0268373 A1  Aug. 25, 2022

(51) Int. Cl.
- *F16L 3/04* (2006.01)
- *F16L 33/207* (2006.01)
- *F16L 33/30* (2006.01)

(52) U.S. Cl.
CPC ............. *F16L 3/04* (2013.01); *F16L 33/2075* (2013.01); *F16L 33/30* (2013.01)

(58) Field of Classification Search
CPC ......... F16L 3/04; F16L 33/2075; F16L 33/30; F16L 3/13; F16L 3/127; F16L 37/1225; F16L 3/12; F16L 3/26
See application file for complete search history.

(56) References Cited

U.S. PATENT DOCUMENTS

| | | | |
|---|---|---|---|
| 3,853,148 A * | 12/1974 | De Vincent | F16L 3/1226 248/74.1 |
| 5,191,276 A | 3/1993 | Zainaleain | |

(Continued)

FOREIGN PATENT DOCUMENTS

| | | | |
|---|---|---|---|
| CN | 209581076 U | * | 11/2019 |
| KR | 20110085627 A | * | 7/2011 |

(Continued)

OTHER PUBLICATIONS

Russell 683942 mounting bracket for automotive fuel system fitting dated Feb. 25, 2011 sold on amazon.com, https://www.amazon.com/RUSSELL-683942-Russell-Mounting-Bracket/dp/B004BTK1XC (Year: 2011).*

(Continued)

*Primary Examiner* — Terrell L McKinnon
*Assistant Examiner* — Ding Y Tan
(74) *Attorney, Agent, or Firm* — Paschall & Associates, LLC; James C. Paschall; Anthony Miologos

(57) ABSTRACT

A quick connector is disclosed comprising a receptacle having first and second channels formed on opposite sides of the exterior of the receptacle. A flange includes a retainer mounting part fixed on a first end of the flange. A first pair of clamping jaws extends from a second end of the flange with each clamping jaw of the first pair of clamping jaws accepted into a respective receptacle first and second channel, clasping the receptacle to the flange. The clamped bracket retainer and receptacle are then guided to have a tube inserted into an interior passage of the receptacle and the bracket retainer is attached to a rigid structure using a fastening arrangement that retains the quick connector receptacle and endform in a connected state.

15 Claims, 5 Drawing Sheets

(56) References Cited

U.S. PATENT DOCUMENTS

| | | | |
|---|---|---|---|
| 5,360,237 A * | 11/1994 | Carman | F16L 37/0987 |
| | | | 24/555 |
| 6,290,264 B1 * | 9/2001 | Inoue | F16L 3/02 |
| | | | 285/87 |
| 6,577,099 B2 | 6/2003 | Kruger et al. | |
| 6,860,515 B2 * | 3/2005 | Inoue | F16L 3/1226 |
| | | | 285/179 |
| 7,316,428 B2 * | 1/2008 | Takayanagi | F16L 3/1226 |
| | | | 285/87 |
| 7,390,025 B2 * | 6/2008 | Pepe | F16L 37/0885 |
| | | | 285/82 |
| 7,427,450 B2 | 9/2008 | Raiser | |
| 7,463,007 B2 | 12/2008 | Phillips et al. | |
| 8,079,552 B2 | 12/2011 | Sweigard | |
| 8,092,932 B2 | 1/2012 | Phillips et al. | |
| 8,671,747 B1 * | 3/2014 | Falkenborg | B60C 23/0494 |
| | | | 73/146.8 |
| 8,944,388 B2 | 2/2015 | Magno, Jr. | |
| 8,950,536 B2 | 2/2015 | Maguire | |
| 9,187,008 B2 | 11/2015 | Inoue et al. | |
| 9,231,285 B2 | 1/2016 | Schmidt et al. | |
| 9,461,286 B2 | 10/2016 | Subramanian et al. | |
| 9,590,216 B2 | 3/2017 | Maguire et al. | |
| 9,678,298 B2 * | 6/2017 | Kimbrell | G02B 6/4471 |
| 9,722,223 B1 | 8/2017 | Maguire | |
| 9,726,304 B2 | 8/2017 | Heath | |
| 10,069,123 B2 | 9/2018 | Maguire | |
| 10,099,572 B2 | 10/2018 | Motokawa | |
| 10,109,823 B2 | 10/2018 | Haag et al. | |
| 10,428,987 B2 | 10/2019 | Gocha | |
| 10,476,059 B1 | 11/2019 | Shepherd et al. | |
| 10,549,706 B2 | 2/2020 | Syed et al. | |
| 10,559,793 B2 | 2/2020 | Smith | |
| 10,632,857 B2 | 4/2020 | Matecki et al. | |
| 10,816,121 B2 * | 10/2020 | Kerin, Jr. | F16L 37/0885 |
| 2001/0017467 A1 * | 8/2001 | Inoue | F16L 37/2445 |
| | | | 285/114 |
| 2006/0061096 A1 * | 3/2006 | Krause | F16L 37/1225 |
| | | | 285/305 |
| 2007/0284167 A1 | 12/2007 | Watanabe et al. | |
| 2008/0318119 A1 | 12/2008 | Watanabe et al. | |
| 2012/0211977 A1 * | 8/2012 | Callahan | F16L 37/144 |
| | | | 285/313 |
| 2014/0087228 A1 | 3/2014 | Fabian et al. | |
| 2015/0159793 A1 * | 6/2015 | Nagaya | F16L 37/0885 |
| | | | 285/93 |
| 2016/0047493 A1 * | 2/2016 | Dickinson | F16G 11/146 |
| | | | 29/453 |
| 2018/0328525 A1 * | 11/2018 | Kerin, Jr. | F02M 37/0017 |
| 2020/0149667 A1 * | 5/2020 | Collins | F16L 27/00 |
| 2022/0026002 A1 * | 1/2022 | Gocha | F16L 37/144 |
| 2022/0243850 A1 * | 8/2022 | Teasley | F16L 37/142 |

FOREIGN PATENT DOCUMENTS

| | | | | |
|---|---|---|---|---|
| KR | | 101295009 B1 * | 8/2013 | |
| KR | | 101295009 B1 | 8/2013 | |
| WO | WO-2006040983 A1 * | | 4/2006 | F16L 37/144 |

OTHER PUBLICATIONS

Dorman fuel line connector ASIN B07DXJ6WC7 sold on amazon dated May 27, 2019 (Year: 2019).*

Hotwin 9.49mm SAE 5/16" 8mm Nylon Fuel Line Quick Connect Release Hose Disconnect Hose sold on amazon, first available date: Oct. 11, 2018, https://www.amazon.com/Hotwin-9-49mm-Connect-Release-Disconnect/dp/B07JVT56VR (Year: 2018).*

"Search Report for COO043-EP dated May 25, 2022".

* cited by examiner

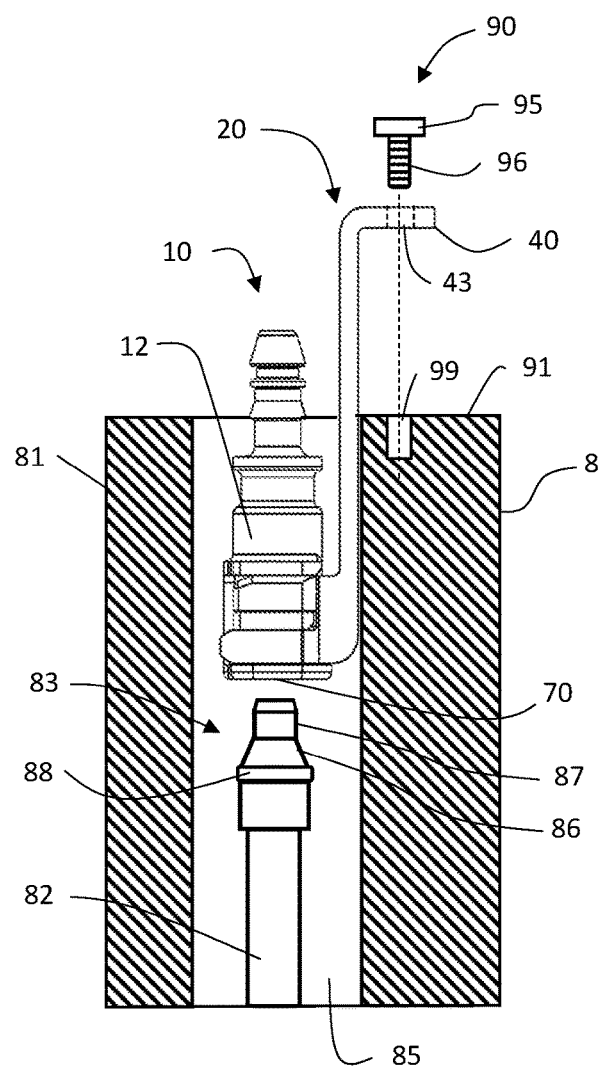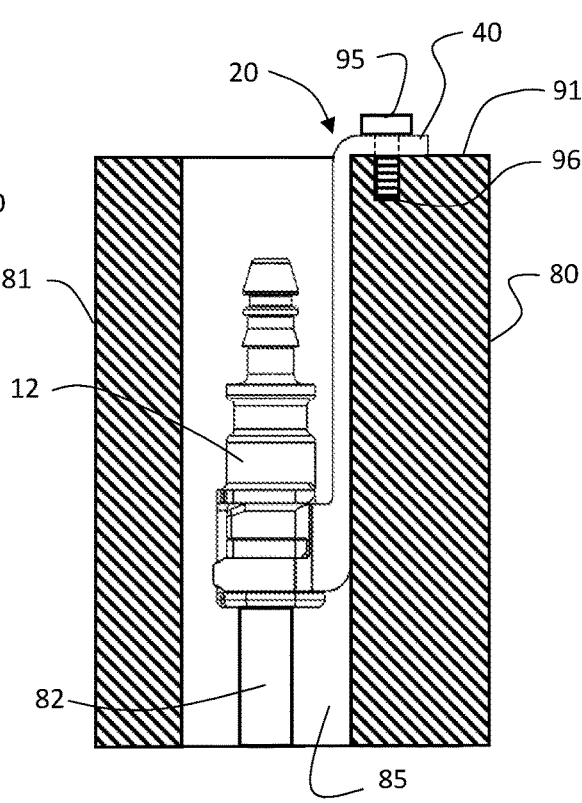
FIG. 8
FIG. 9

QUICK CONNECTOR WITH BRACKET RETAINER

TECHNICAL FIELD

This disclosure is generally directed to quick connectors. More specifically, this disclosure is directed to a quick connector having a bracket retainer that can be snapped onto a connector to retain the connector mated to a tube.

BACKGROUND

In fluid piping in which a tube, such as a pipe or a hose, is joined to another device such as a pump, tank or another tube, a connector may be used for joining the tube to the other device. The connector may have a tubular receptacle for receiving a tube. The tube may include an endform for snap engagement to enable quick connection with a retainer to provide locking relation between the tube and the connector. A wire retainer is often used that has a pair of engagement arms that extend through slots in the receptacle to clip the endform in the connector.

The connector may include a seal ring between an inner periphery of a socket in the connector and an outer periphery of the endform to provide a fluid-tight seal that prevents leaking.

The known connectors often have the disadvantage that the male plug-in part fixing the female plug-in retainer is difficult particularly when there is not sufficient space around the parts to position them properly. Additionally, when space is tight a further disadvantage of the known connectors is that the wire retainer may not be easily accessible to either engage or completely separate from the connector, in particular when it is transferred to an open position, where it may be lost. It would be desirable to provide a connector that can be an easily installed and easily separable to provide a fluid connection in a confined space where a normal quick connector cannot be engaged or serviced.

SUMMARY

This disclosure is directed to a quick connector having a bracket retainer that can be snapped onto a connector to retain the connector mated to a tube.

In a first embodiment, a connector is disclosed comprising a receptacle having first and second channels formed on opposite sides of the exterior of the receptacle. A flange includes a retainer mounting part fixed on a first end of the flange. A first pair of clamping jaws extends from a second end of the flange with each clamping jaw accepted into a respective receptacle first and second channel, clasping the receptacle to the flange.

In a second embodiment, the connector receptacle further includes third and fourth channels formed on opposite sides of the exterior of the receptacle and the flange further includes a second pair of clamping jaws extending from the second end of the flange. Each clamping jaw is accepted into a respective receptacle third and fourth channel further clasping the receptacle to the flange.

In a third embodiment, an assembly of a connector and a tube is disclosed. The assembly comprising a receptacle that includes an interior passage and first and second channels formed on opposite sides on the exterior of the receptacle. A flange includes a retainer mounting part on a first end of the flange. The retainer mounting part including a fastening arrangement adapted to mount the retainer mounting part to a structure. A first pair of clamping jaws extends from a second end of the flange with each clamping jaw accepted into a respective receptacle first and second channel clasping the receptacle to the flange. The receptacle is installed on the tube by inserting the interior passage over the tube and the receptacle retained to the tube by engaging the fastening arrangement to mount the retainer mounting part to the structure.

In a fourth embodiment, the receptacle of the assembly further includes third and fourth channels formed on opposite sides of the exterior of the receptacle. The flange further includes a second pair of clamping jaws extending from the second end of the flange, each clamping jaw of the second pair of clamping jaws accepted into a respective receptacle third and fourth channel further clasping the receptacle to the flange.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIG. 8 illustrates a side elevational view of the assembled receptacle and bracket retainer positioned to connect a tube and endform to the receptacle according to this disclosure; and FIG. 9 illustrates the side elevational view of FIG. 8 of the assembled receptacle and bracket retainer connected to a tube and endform and retained on a structure according to this disclosure.

DETAILED DESCRIPTION

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

The purpose of the present disclosure is to provide a bracket retainer that can be clamped onto a quick connector female receptacle. The clamped bracket retainer and receptacle are then guided to have an endform on the end of a tube inserted into the interior passage of the receptacle and to make a fluid tight connection. Once the receptacle and endform are connected, the bracket retainer is attached to a rigid structure using a fastening arrangement, thereby retaining the quick connector receptacle and endform in a connected state.

Figure 1:
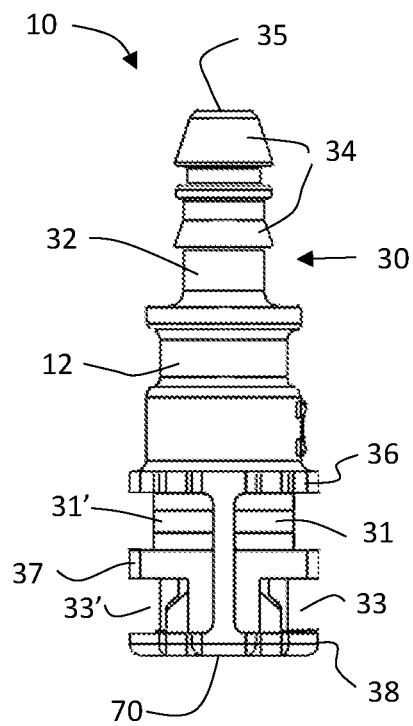
FIG. 1 illustrates a front elevational view of the receptacle of a quick connector according to this disclosure.
Figure 5:
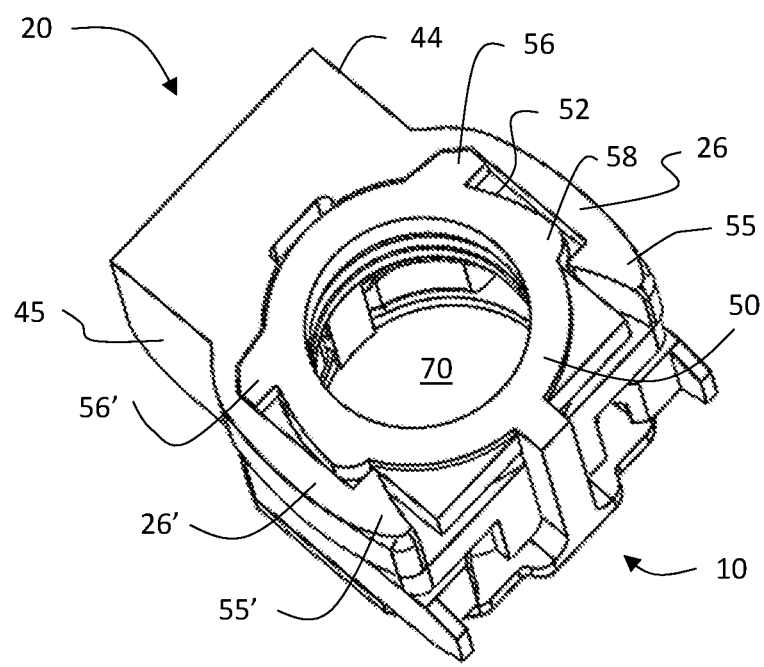
FIG. 5 illustrates an isometric sectional view through the receptacle and bracket retainer illustrating the first pair of clamping jaws clasping the receptacle according to this disclosure.

With reference to FIG. 1 an exemplary quick connector 10 is shown of a type that can be used on the bracket retainer of the present disclosure. The quick connector 10 provides a fluid tight connection between two fluid lines. The connector 10 includes a receptacle 12, having a coupling end 30 for coupling the connector 10 to another device or to a tube. The coupling end 30 may include a hollow male stem 32 having a cylindrical interior channel leading to opening 35. The male stem 32 may include one or more barbed flanges 34 that can be friction fitted into another tube (not shown), for example, to couple the connector 10 to the other tube. A tube having an endform is arranged to be inserted into a cylindrical and hollow passage 70 located in the interior of the receptacle 12, and which can be seen in FIGS. 5 and 6.

The receptacle 12 further includes a first pair of rectangular channels 31 and 31' formed on each side of the receptacle 12. The first pair of channels 31 and 31' are formed between rib members 36 and 37. A second pair of rectangular channels 33 and 33' are defined on the exterior sides of the receptacle 12 between rib member 37 and a base member 38.

Figure 2:
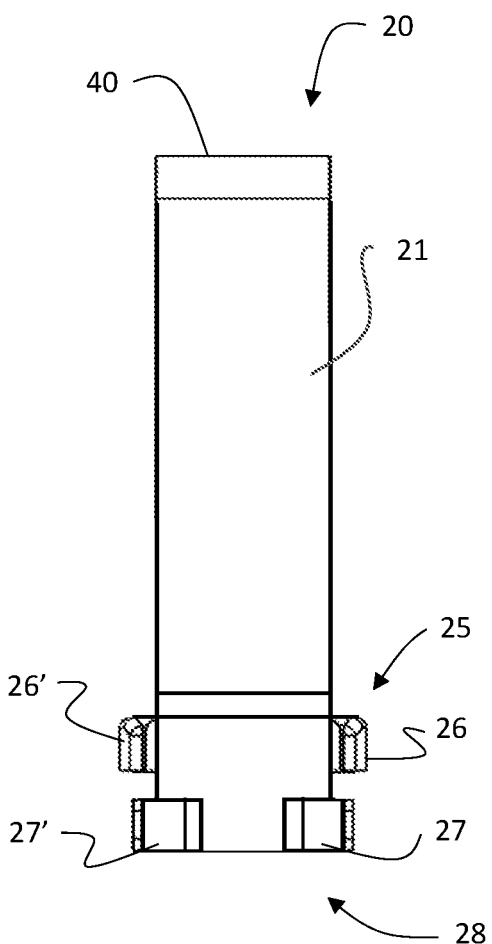
FIG. 2 illustrates a front elevational view of the bracket retainer according to this disclosure.

Turning to FIG. 2. a front elevational view of the bracket retainer 20 of the present disclosure is illustrated. The bracket retainer 20 includes a rectangular flange 21 having a retainer mounting part 40 extending from a first end of the flange 21. A first pair of clamping jaws 25 comprising of identical arms 26 and 26' extend from each side of the flange 21 at a second end. A second pair of clamping jaws 28 are comprised of identical arms 27 and 27' extend outward of flange 21 below the first pair of clamping jaws 25.

Figure 3:
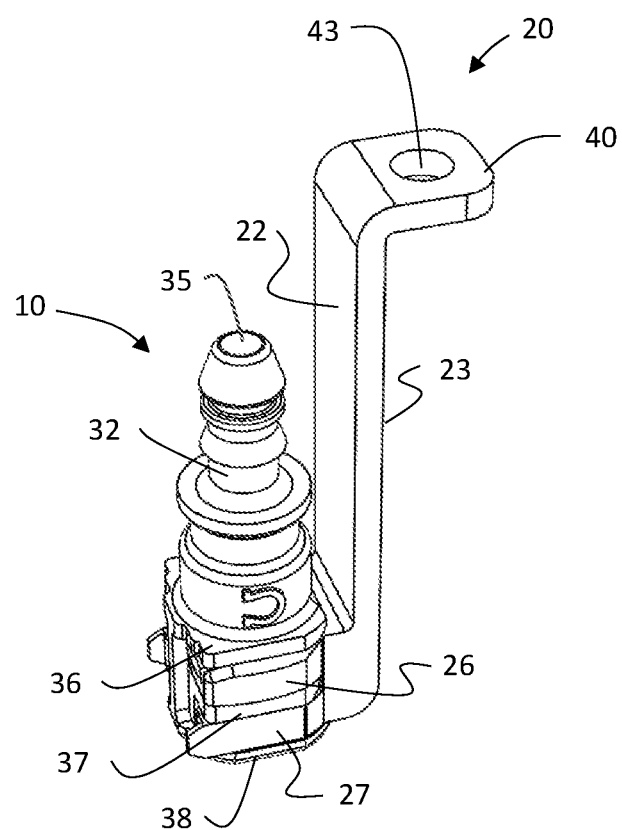
FIG. 3 illustrates an isometric view of the receptacle assembled on the bracket retainer according to this disclosure.

FIG. 3 is an isometric view of the bracket retainer 20 assembled to connector 10 in accordance with the present disclosure. The flange 21 of bracket retainer 20 includes a first surface 22 and a second surface 23. The retainer mounting part 40 extends from the first end of the flange 21 second surface 23. A mounting hole 43 is centrally located on the retainer mounting part 40. The hole 43 extends through the retainer mounting part 40. The hole 43 is arranged to accept various forms of fasteners to make a fastening arrangement that fastens the flange 20 to a structure. For example, a threaded fastener can be positioned through the hole 43 to be threaded on a threaded bore located on a structure, such as frame or other rigid member. The first pair of clamping jaws 25 extend outward of the first surface 22 from a second end of the flange 20. Each arm 26 of the first pair of clamping jaws 25 is arranged to be accepted into a respective channel 31 on receptacle 12. Similarly, each arm 27 of the second pair of clamping jaws 28 are arranged to be accepted within a respective channel 33. As can be best seen at FIG. 3, the arms 26 and 27 of the clamping jaws 25 and 28 clasp the receptacle 12 to the bracket retainer 20.

Figure 4:
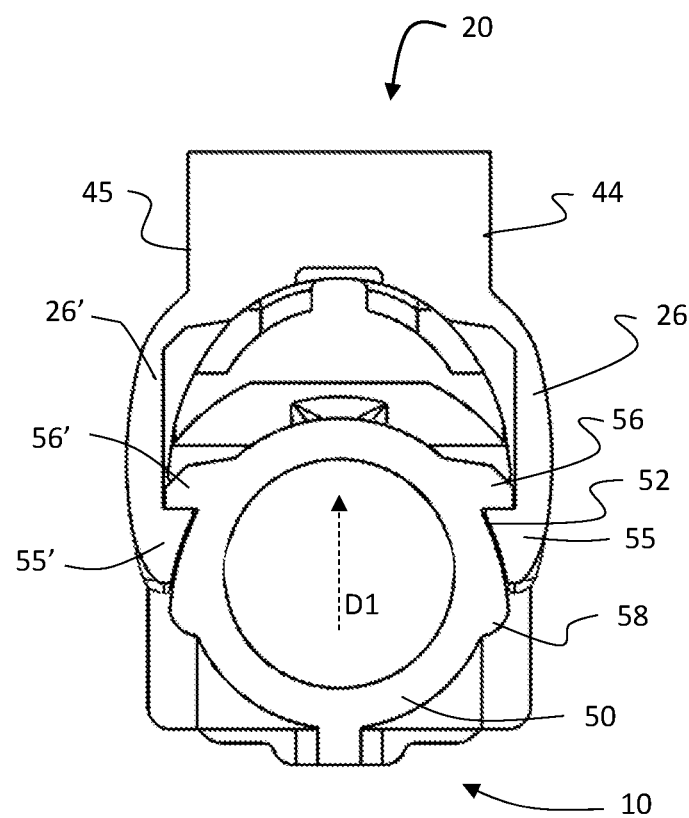
FIG. 4 illustrates a top sectional view through the receptacle and bracket retainer illustrating the positioning of the first pair of clamping jaws to the receptacle before clasping the receptacle according to this disclosure.

Turning now to FIG. 4. a section through the receptacle 12 taken just below the rib member 36 is illustrated. A first arm 26 of the first pair of clamping jaws 25 extends from a respective flange 20 edge surface 44. A second arm 26' of the first pair of clasping jaws 25 extends from a respective flange 20 edge surface 45. Each arm 26 and 26' is integrally attached to its respective edge surface 44 and 45 and each arm 26 and 26' extends circuitously from the attached end to a free end that includes a respective clasping finger 55 and 56'. The receptacle 12 further includes a surface 50 that is molded as a part of rib member 36 and that includes stop members 56, edges 52, and clasping surfaces 58. FIG. 4 illustrates the partial assembly of the clamping jaws 25 to receptacle 12 in a first position. As can be seen in FIG. 4, in the first position, each arm 26 and 26' is inserted into a respective channel 31 and 31' until finger 55, 55' engages the front end of stop members 56 and 56'.

The receptacle 12 is mounted into a second clamped position by applying a force to the receptacle in direction D1. As the receptacle is pushed further into the clamping jaws 25 each of the fingers 55, 56 rides against a respective edge 52 of surface 50. Due to the outwardly orientation of edges 52, each arm 26, 26' is spread outward from its normal relaxed positions. As can be best seen in FIG. 5, when the receptacle 12 is fully installed against the clamping jaws 25, each arm 26 and 26' snap back to their relaxed position allowing each finger 55, 55' to lock against clasping members 58, allowing the clamping jaws 25 to clasp the receptacle 12.

Figure 6:
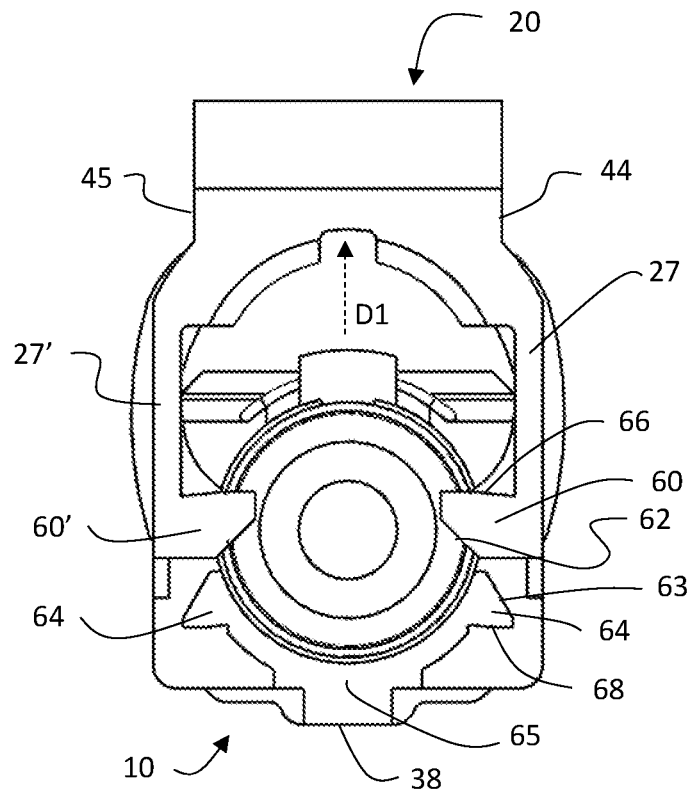
FIG. 6 illustrates a top sectional view through the receptacle and bracket retainer illustrating the positioning of the second pair of clamping jaws to the receptacle before clasping the receptacle according to this disclosure.

FIG. 6. illustrates a section through the receptacle 12 taken just below the rib member 37. A first arm 27 of the second pair of clamping jaws 28 extends from a respective flange 20 edge surface 44. Another arm 27' of the second pair of clamping jaws 28 extends from a respective flange 20 edge surface 45. Each arm 27 and 27' is integrally attached to its respective edge surface 44 and 45 and each arm 27 and 27' extends from the attached end to a free end that includes a respective clasping finger 60 and 60'. Each clasping finger 60 and 60' further includes a chamfered edge 62 and a clasping edge 66. Since each arm 27 and 27' and their associated fingers 60 and 60' are identical the explanations of the operation of clasping the receptacle 12 in accordance to this embodiment will be made using only reference to chamfered edge 62 and a clasping edge 66. It will be appreciated that arm 27' and its associated finger 60' operate to clasp the receptacle 12 in the same manner.

The receptacle 12 includes a surface 65 that is molded as a part of the base member 38. Surface 65 includes a pair of tooth members 64 with each tooth member located in a respective channel 38 and 38'. Each tooth member 64 further includes a chamfered edge 63 and a locking edge 68. FIG. 6 illustrates the partial assembly of the clamping jaws 28 to receptacle 12 in a first position. It should be noted that the second pair of clamping jaws 28 are retained in the first position by the action of arms 26 and 26' of clamping jaws 25 and fingers 55 and 55', engaging the front end of stop members 56, as was explained above. Do to clamping jaws 25 and 28 extending from the same edge surfaces 44 and 45 of bracket retainer 20 all motion and directionality are imparted to both clamping jaws 25 and 28 similarly. Therefore, when clamping jaws 25 reach the first position the clamping jaws 28 are also retained in a first position as shown in FIG. 6

Figure 7:
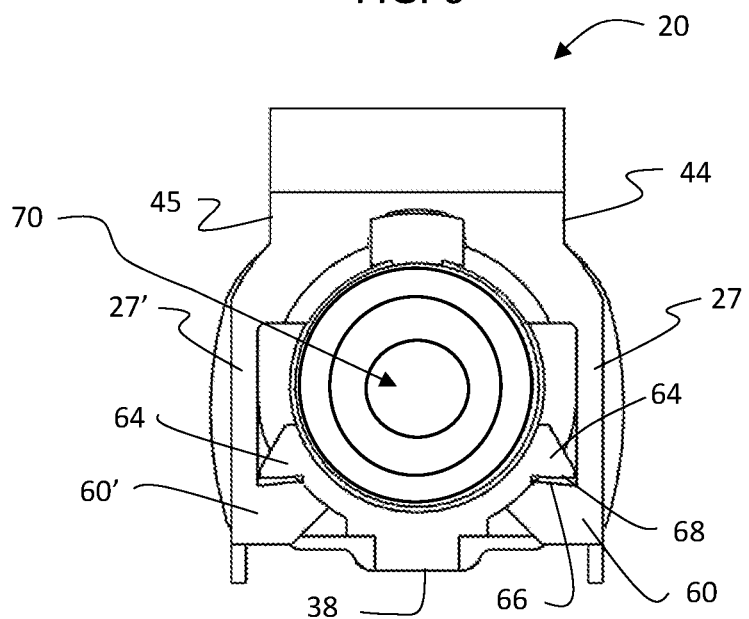
FIG. 7 illustrates a bottom sectional view through the receptacle and bracket retainer illustrating the second pair of clamping jaws clasping the receptacle according to this disclosure.

The receptacle 12 is mounted into a second clamped position by applying a force to the receptacle 12 in direction D1. As the receptacle is pushed further into the clamping jaws 28, the chamfered edge 62 of member 60 rides against the chamfered edge 63 of clasping tooth 64. Due to the outwardly orientation of edges 63, arms 27 and 27' are spread outward from their normal relaxed positions. As can be best seen in FIG. 7, when the receptacle 12 is fully installed against the clamping jaws 28, the chamfered edges 62 of clasping fingers 60 and 60' ceases to ride against the chamfered edges 63 of clasping teeth 64 and arms 27 and 27' resume their relaxed positions. Arms 27 and 27' snap back engaging clasping edge 66 of each finger 60 and 60' to engage a respective locking edge 68, allowing the clamping jaws 28 to clasp the receptacle 12. It will be appreciated that the action of clamping jaws 25 and 28 clasping the receptacle 12 occurs at the same moment.

With the installation of the receptacle 12 on bracket retainer 20, the assembly of the receptacle and bracket retainer can be used to make a fluid connection with a tube 82. FIGS. 8 and 9 illustrate one example of how the disclosure of the present invention may be used to advantage. In this particular example, a tube 82 is located within a duct 85 that is bordered by at least two structural members or walls 80 and 81. Even though only two walls 80 and 81 are shown, the duct 85 can be formed between three or four walls or the duct 85 may be a cylindrical cavity or hollow formed inside a structural member. In the present example, due to the narrow dimensions between walls 80 and 81 the usual method of locking and unlocking a quick connector with a typical wire retainer would be difficult if not impossible to do using hand tools.

With renewed reference to FIG. 8, the assembly of the quick connector receptacle 12 and bracket retainer 20 is illustrated. A tube 82 that includes an endform 83 forming the terminus of the tube 12 is located in duct 85. The endform 83 is shaped to include matching surfaces that engage the surfaces of the receptacle 12 interior passage 70. For example, surfaces 86 and 87 on endform 83, would be accepted in matching surfaces found in interior passage 70. An O-ring 88 on endform 83 would provide a fluid tight seal between the endform 83 and the walls of the interior passage 70. The receptacle 12 is installed on the endform 83 by lowering the receptacle to have the endform 83 enter the interior passage 70 until the retainer mounting part 40 rests on surface 91 of wall 80 with hole 43 aligned with a threaded bore 90. A fastener 90 has a threaded portion 96 installed in the hole 43 to make a threaded connection with threaded bore 99 allowing the bolt head 90 to hold the retainer mounting part 40 and the assembly of the receptacle 12 and bracket retainer 20 in a connected and locked position. It should be noted that a threaded fastener is used to explain the present disclosure, however other forms or types of fasteners may be used to practice the disclosure. For example, such as, a quarter-turn connector, a clevis and pin, or a rivet.

As shown in FIG. 9, the connector assembly by virtue of being attached to wall 80 retains the receptacle 12 in a connected state with the endform 83. Fluid pressures transferred from the tube 82 into the receptacle 12 do not disconnect the receptacle 12 from the endform 83 by virtue of the connection of the bracket retainer 20 by fastener 90 to the adjoining structure.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A connector arranged to be installed on an endform, the endform located within a duct formed by at least two walls of a structure, the connector comprising:
   a receptacle having an interior passage and first and second and third and fourth channels formed on opposite sides of the exterior of the receptacle;
   a flange having a retainer mounting part fixed on a first end of the flange arranged to be fastened to the structure adjacent the duct;
   a first pair of clamping jaws extending from a second end of the flange in a counter direction to the retainer mounting part, each clamping jaw accepted into a respective receptacle first and second channel clasping the receptacle to the flange;
   a second pair of clamping jaws extending from the second end of the flange in a counter direction to the retainer mounting part, each third and fourth channel including a clasping tooth and each jaw of the second pair of clamping jaws including an arm extending from the flange first surface at one end to a clasping finger on another end,
   wherein each arm of the second pair of clamping jaws is retained in a respective third and fourth channel by the clasping finger engaging the clasping tooth; and
   the receptacle and the second end of the flange are placed into the duct in a direction that installs the receptacle interior passage on the endform, wherein the receptacle is retained on the endform when the flange retainer mounting part is fastened to the structure using a fastener that is attached to the structure in the direction that installed the receptacle to the endform.

2. The connector of claim 1, wherein the third and fourth channels are located below the first and second channels.

3. The connector of claim 1, wherein the flange includes first and second surfaces and the retainer mounting part extends perpendicular from the flange second surface at the flange first end.

4. The connector of claim 3, wherein the first and second clamping jaws extend perpendicular from the flange first surface at the flange second end.

5. The connector of claim 4, wherein each of the first and second channels includes a clasping surface and each jaw of the first pair of clamping jaws, comprises an arm extending circuitously from the flange first surface at one end to a clasping finger on a second end, each arm retained to a respective first and second channel by the clasping finger engaging the clasping surface.

6. The connector of claim 3, wherein the retainer mounting part includes a hole extending through the retainer mounting part arranged to accept the fastener therethrough and fasten the retainer mounting part to the structure.

7. An assembly of a connector and a tube, the assembly comprising:
   an endform formed on an end of the tube, the endform and the tube located in a duct formed by at least two walls;

a receptacle including an interior passage, the interior passage having matching surfaces that engage the endform and having first and second and third and fourth channels formed on opposite sides on the exterior of the receptacle;

a flange having a retainer mounting part on a first end of the flange, the retainer mounting part including a fastening arrangement for mounting the retainer mounting part to a structure adjacent the duct;

a first pair of clamping jaws extending from a second end of the flange in a counter direction to the retainer mounting part, each clamping jaw accepted into a respective receptacle first and second channel, clasping the receptacle to the flange; and a second pair of clamping jaws extending from the second end of the flange in a counter direction to the retainer mounting part, each third and fourth channel including a clasping tooth and each jaw of the second pair of clamping jaws including an arm extending from the flange first surface at one end to a clasping finger on another end and each arm of the second pair of clamping jaws is retained in a respective third and fourth channel by the clasping finger engaging the clasping tooth, wherein the receptacle and the second end of the flange are placed into the duct in a direction that installs the receptacle interior passage over the endform and the receptacle is retained to the tube by attaching the fastening arrangement to the structure in the direction that installed the receptacle to the endform.

8. The assembly of claim 7, wherein the third and fourth channels are located below the first and second channels.

9. The assembly of claim 7, wherein the flange includes first and second surfaces and the retainer mounting part extends perpendicular from the flange second surface at the flange first end.

10. The assembly of claim 9, wherein the first and second clamping jaws extend perpendicular from the flange first surface at the flange second end.

11. The assembly of claim 10, wherein each of the first and second channels includes a clasping surface and each jaw of the first pair of clamping jaws, comprises an arm extending circuitously from the flange first surface at one end to a clasping finger on a second end, each arm held in a respective first and second channel by the clasping finger engaging the clasping surface.

12. The assembly of claim 7, wherein the fastening arrangement is comprised of a hole extending through the retainer mounting part and a fastener having a head retained on the retainer mounting part and a threaded body accepted in the hole; and wherein the structure includes a threaded bore accepting the threaded body and retaining the retainer mounting part to the structure.

13. The assembly of claim 7, the endform installed within the interior passage provides a fluid tight seal between the endform and the interior passage.

14. The assembly of claim 7, wherein the flange, the retainer mounting part and first and second pair of clamping jaws are formed as unitary structure from a metallic material.

15. The assembly of claim 7, wherein the flange, the retainer mounting part and first and second pair of clamping jaws are formed as unitary structure from a thermoplastic material.

* * * * *